United States Patent [19]

Isago et al.

[11] 4,139,829

[45] Feb. 13, 1979

[54] METHOD FOR ADJUSTING A BAND DIVISION TYPE EQUALIZER

[75] Inventors: Takao Isago, Ichikawa; Tomokazu Komazaki, Omiya, both of Japan

[73] Assignee: Kokusai Denshin Denwa Co., Ltd., Tokyo, Japan

[21] Appl. No.: 808,476

[22] Filed: Jun. 21, 1977

[30] Foreign Application Priority Data

Jun. 23, 1976 [JP] Japan .................................. 51/73088

[51] Int. Cl.² .............................................. H03H 7/14
[52] U.S. Cl. ..................................... 333/28 R; 333/18
[58] Field of Search ............................... 333/18, 28 R

[56] References Cited

U.S. PATENT DOCUMENTS

| 3,336,539 | 8/1967 | Kwartiroff et al. | 333/28 R X |
| 3,715,691 | 2/1973 | Kurth | 333/18 |
| 3,733,565 | 5/1973 | Pierret | 333/28 R |
| 3,883,830 | 5/1975 | Hekimian | 333/28 R |

Primary Examiner—Paul L. Gensler
Attorney, Agent, or Firm—Armstrong, Nikaido, Marmelstein & Kubovcik

[57] ABSTRACT

In a band division type equalizer having a plurality of equalizer sections, the adjustment of each of the equalizer sections is accomplished through measurement of characteristics of a transmission means to be equalized and calculation of the difference of the measured characteristics and the desired characteristics. Since all of the equalizer sections are adjusted at the same time according to the result of the calculation, the adjustment does not suffer from interaction among the sections. An adjustable variable, for instance, a variable resistor for each section is mounted in a single setting unit separable from the rest of the equalizer circuit. Thus, after completely adjusting the setting unit, the setting unit is connected to the rest of the equalizer sections, and then the desired delay characteristic can be obtained. The equalizer section is for instance a Moschytz type delay circuit.

6 Claims, 8 Drawing Figures

METHOD FOR ADJUSTING A BAND DIVISION TYPE EQUALIZER

BACKGROUND OF THE INVENTION

The present invention relates to a method for adjusting an equalizer having a plurality of variable-type band-division equalizer sections, and in particular, relates to an improved equalization method which provides the optimum setting for all equalizing sections taking into account the interaction among all equalizing sections (hereinafter called "interaction"), and an improved equalization method in which any difficulties arising from such interaction are eliminated by giving a "set" command through the calculation of the interaction.

An equalizer having a plurality of variable-type band-division equalizer sections for equalizing the delay characteristics of a transmission circuit is well known. When the required characteristics of the transmission circuit are severe, the total equalization characteristic of an equalizer is equal to the sum of the characteristics of each individual equalizer section. For instance, when the required characteristic is flat, the equalizer must have the inverse characteristics of the transmission circuit. The equalizer mentioned above is called a variable-type band-division equalizer.

FIG. 1 shows an example of an equalizer of this type which is employed for delay equalization for voice bands. In FIG. 1 showing a circuit unit 1 and a setting unit 2, the input signal is, after being amplified to a desired level by an amplifier AMP, equalized through a low band circuit LB, a high band circuit HB, and equalizing sections, SEC 1 (0.6 KHz) through SEC 12 (2.8 KHz), which are provided at intervals of 200 Hz. The setting of the variable characteristics is accomplished by switches for LB and HB and by variable resistors, RF 1 through 12 which connect to the equalizing sections, SEC 1 through 12.

FIG. 2 shows an example of some of the variable characteristics of SEC 8 (f=2.0 KHz) which shows clearly the change of delay time depending upon the resistance of RF8, such as r 1, r 2, r 3 . . . . However, while it has the advantage of being adjustable for any desired characteristic, an equalizer of this type has the disadvantage of requiring skill and a considerable amount of time for adjustment. As is clearly seen from the variable characteristics shown in FIG. 2, the variable characteristics of one of the equalizing sections interact not only upon the section adjacent thereto but also upon all the other sections, and more over such interaction is of such a nature as to change the characteristics asymmetrically and non-linerally. This causes the above difficulty in the adjustment of an equalizer.

FIG. 3 shows an example of the interaction between one of the equalizing sections, SEC 8 (f=2.0 KHz), and the other sections, SEC 6 (f=1.6 KHz), SEC 7 (f=1.8 KHz), SEC 9 (f=2.2 KHz) and SEC 10 (f=2.4 KHz). It should be noted that the interaction $I_{87}$ and $I_{89}$ respectively upon SEC 7 and SEC 9 by SEC 8 and $I_{86}$ and $I_{810}$ respectively upon SEC 6 and SEC 10 by SEC 8 are all asymmetrical to the characteristics of SEC 8 itself ($I_{88}$) and are non-linear.

For adjustment of the equalizer of the above type, a method by means of a delay measuring apparatus as schematically illustrated in FIG. 4 (A) and FIG. 4 (B), has conventionally been employed. For transmission equalization in FIG. 4 (A), a transmitting station 10 sends a sweep signal, (f=0.3 KH$_z$ through 3.4 KHz), from the sweep oscillator 11a in a delay distortion measuring apparatus 11, to a line 15, and in a receiving station 20 which receives the signal, the value of delay distortion in the line 15, is detected by a detector 21a, and is sent back through the re-modulator 21b in a delay distortion measuring apparatus at a given frequency, for example, f=2.0 KHz, to the transmitting station 10, in which this information is detected by a detector 11b and is indicated on the screen of an indicator 12. Thus, the adjustment of the equalizer 13 and/or 23 is manually accomplished.

Further referring to FIG. 4 (A), numerals 13 and 23 are equalizers, and 15 is an international data line.

Reception equalization as illustrated in FIG. 4 (B) is accomplished by a procedure similar to that for the transmission equalization in FIG. 4 (A). In FIG. 4 (B), 10' is a transmitting station, 20' is a receiving station, 15' is an international data line, 11a' is the sweep ocillator section of a delay distortion measuring apparatus, 12a' is the detector section of the delay distortion measurer, 22 is a display device, and 13' and 23' are equalizers. It is the advantage of the above equalization method that high precision of equalization can be attained. However, the sweep step requires not only a long time of operation but also a certain skill. Furthermore, remote control of the measuring devices, that is to say, the control of the apparatus at the receiving station from the transmission station, and the control of the apparatus at the transmission station from the receiving station, is necessary when an international data line is to be equalized. However, due to the limit of operation hours in a day, and/or the inadequacy of apparatuses at both stations, the adjustment of an equalizer by the method in FIG. 4 (A) or FIG. 4 (B) is very difficult.

SUMMARY OF THE INVENTION

It is an object, therefore of the present invention to overcome the disadvantages and limitations of a prior equalizer by providing an improved method for adjusting an equalizer.

It is also an object of the present invention to provide a new and improved structure of an equalizer.

The above and other objects are attained by a method for adjusting a band division type equalizer having a plurality of equalizer sections the characteristics of each of which are obtainable through the calculation of the value of an adjusted variable resistance comprising the steps of providing said equalizer with a setting unit having a plurality of switches and variable resistors for adjusting each of said equalizer sections and a circuit unit for equalizing a transmission line according to the set value in said setting unit, said setting unit being electrically connected to and disconnected from said circuit unit, measuring the characteristics of a transmission line to be equalized, calculating the adjustment of said setting unit from the measured characteristics and the desired characteristics through a predetermined algorithm, adjusting said setting unit according to the result of the above calculation, and connecting the setting unit to said circuit unit.

The other features of the present invention is a method for adjusting a band division type equalizer having a plurality of equalizer sections the characteristics of each of which are obtainable through the calculation of the value of an adjusted variable resistance comprising the steps of providing said equalizer with a setting unit having a plurality of switches and variable resistors for adjusting each of said equalizer sections and a circuit unit for equalizing a transmission line according to the set value in said setting unit, said setting unit being electrically connected to and disconnected from said circuit unit, measuring the characteristics of a transmission line to be equalized, disconnecting said setting unit from said circuit unit, calculating the characteristics of each of said equalizer sections from the setting value in said setting unit, calculating the difference between the characteristics of each equalizer sections and the desired characteristics, adjusting said setting unit when said difference is larger than an allowable error, repeating said two calculating steps and adjusting step until said difference is made smaller than an allowable error, and connecting the setting unit to said circuit unit.

BRIEF DESCRIPTION OF THE DRAWINGS

The foregoing and other objects, features, and attendant advantages of the present invention will be appreciated as the same become better understood by means of the following description and accompanying drawings wherein.

DETAILED DESCRIPTION OF THE PREFERRED EMBODIMENTS

Figure 1:
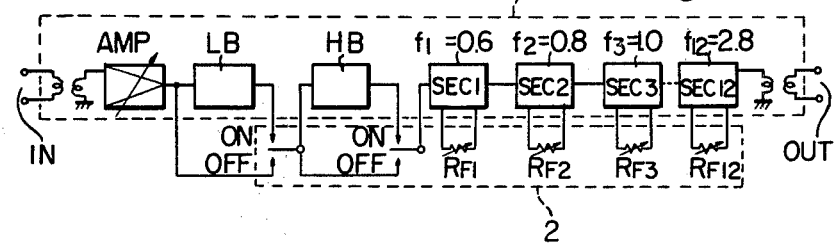
FIG. 1 is a block diagram of the arrangement of a variable-type frequency band-division equalizer.
Figure 2:
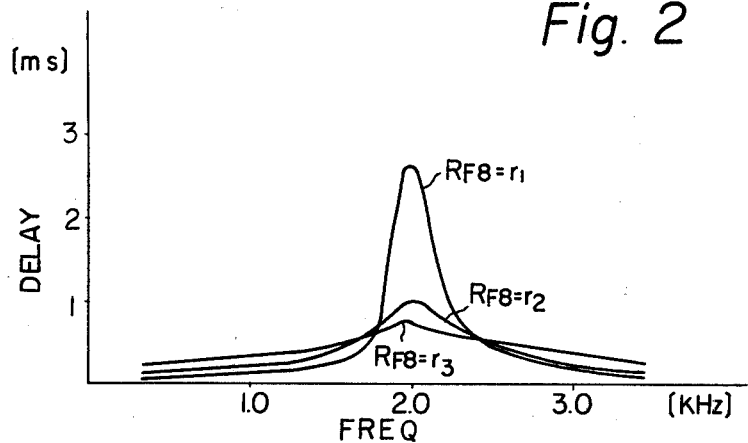
FIG. 2 is a diagrammatic illustration of the variable characteristics of the equalizer.
Figure 3:
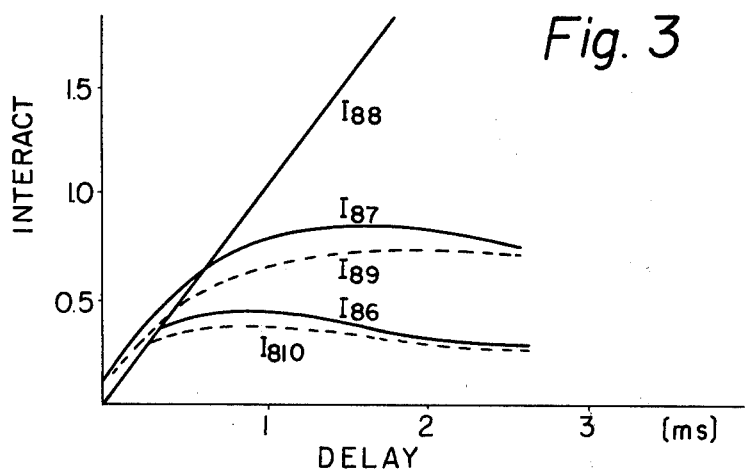
FIG. 3 is a diagrammatic view of interaction between an equalizing section and the other sections adjacent thereto.
Figure 4A:
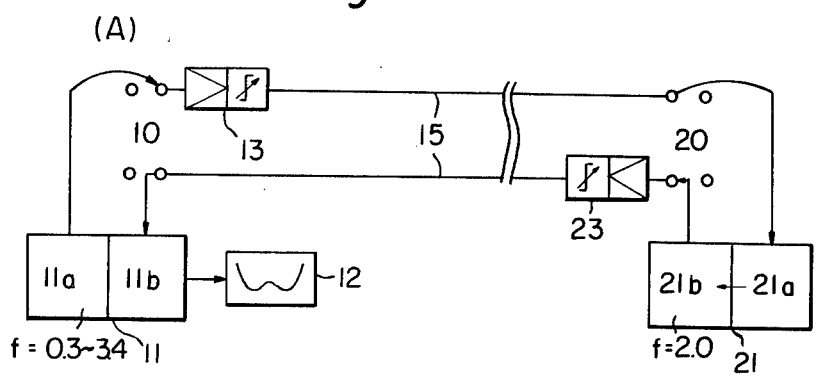
FIGS. 4 (A) and 4 (B) are illustrative block-schematic views of a conventional equalization method.
Figure 4B:
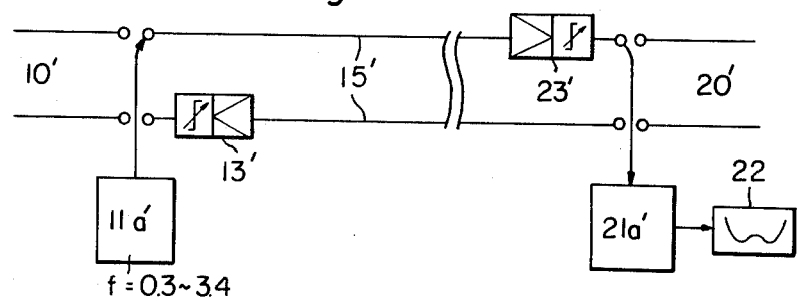
Figure 5:
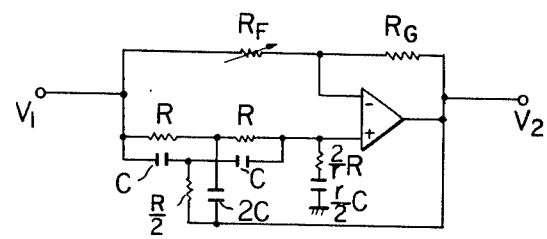
FIG. 5 is a schematic view of the circuit arrangement of an example of an equalizer according to the present invention.

First of all, it should be pointed out that the variable-type band-division equalizer is equipped with a setting unit 2 and a circuit unit 1, as shown in FIG. 1, which are so arranged as to be mechanically separated or coupled to each other, and that said setting unit 2 may be connected to an equalizer simulator utilizing an equalization method according to the present invention. In an equalizer of this type having a setting unit and a circuit unit in a separating or coupling relation, an advantage is that, even in the event of circuit trouble, re-adjustment of the equalizer is not necessary. Furthermore, there is a formula showing the relationship between the setting value of said setting unit and the variable characteristics obtained, and the characteristics at any selected frequency of an equalizer can be obtained from said formula. For example in the Moschytz delay equalizing circuit shown in FIG. 5, the variable characteristic T(S), is expressed as follows:

$$T(S) = \frac{V2}{V1} = \quad (1)$$

$$\frac{S^2 - \frac{Wo}{Q} S + Wo^2}{S^2 + \frac{Wo}{Q} S + Wo^2} = \frac{S^2 - \frac{1}{RC} \mu(r+4)S + \frac{1}{(RC)^2}}{S^2 + \frac{1}{RC} \mu(r+4)S + \frac{1}{(RC)^2}}$$

$$\text{where, } \mu = \frac{R_G}{R_F} = \frac{r}{r+8}$$

Hereinafter, each equalizing section has the variable characteristics illustrated in the formula (1) above. Further, it is assumed that the measurement of the characteristics at M frequency points, for example, 32 points between 0.3 KHz and 3.4 KHz at intervals of 100 Hz is provided, and that in a band of 0.3 KHz–3.4 KHz a flat characteristic or normalized characteristic like the C.C.I.T.T. recommendation M-102 (C.C.I.T. Recommendation, Green Book, Vol IV. 1. Page 197–203 published by the International Telecommunications Union) is designated.

Now the first embodiment of the present invention will be explained. In this embodiment, the setting value which satisfies the equalization characteristics required is obtained from a predetermined algorithm for each equalization section, and the equalization simulator adjusts the equalizer according to said setting value. The above procedure is repeated until the actual characteristics of each section coincides with the desired characteristics, and finally, the setting unit is connected to the circuit unit. A detailed explanation of this embodiment will follow.

Figure 6:
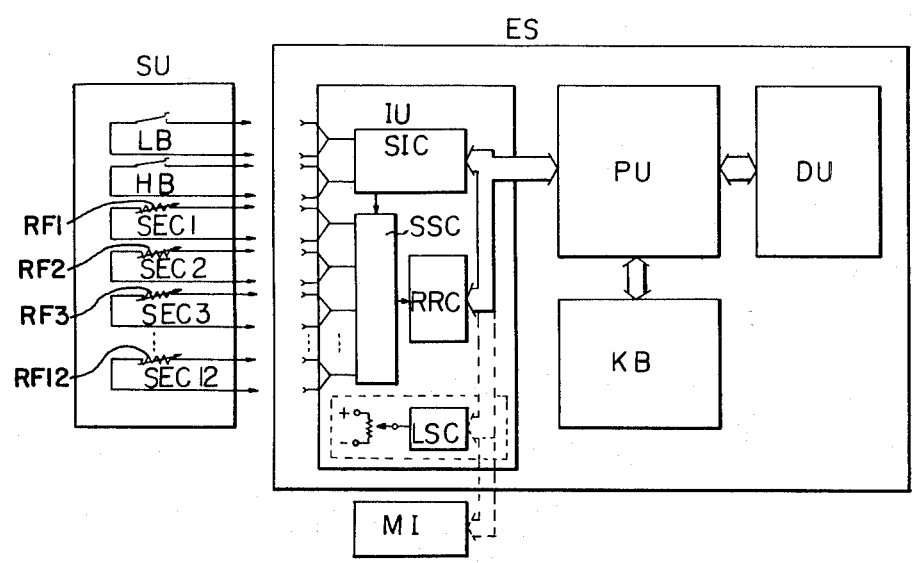
FIG. 6 is a block diagram of the arrangement of an equalizer simulator according to the present invention.

FIG. 6 shows an example of the circuit arrangement of an equalizer simulator according to the present invention. In FIG. 6 SU represents a setting unit of a variable-type band-division equalizer. The equalizer simulator, designated ES, comprises an interface unit IU for reading the setting value of SU, a processing unit PU for calculating the optimum setting value, a key board KB for the input of various parameters including the measured characteristics, and a display unit DU for providing a necessary display like a "set" command or "end" command. The setting unit SU is composed of variable resistors RF1 through RF12, which are individually adjustable in relation to the equalizing sections SEC 1 through 12, and a pair of switches for selectively inserting a low band equalizing circuit LB, and a high band equalizing circuit HB. Similarly, the interface unit IU composed of a resistance readout circuit RRC, a section selecting circuit SSC, and a section interface circuit SIC for the interface control of the selected section. An example of such a simulator is a desk computer, such as the M 9825A produced by Hewlett-Packard, having a processing unit (PU), a key board KB and a display unit DU built in, and an interface unit IU and the standard bus-line (for instance IEEE standard bus) for connecting the computer and IU.

The following is an example of an operation for equalization using the above equalizer simulator:

(1) To input the delay characteristics of a line to be equalized for example those from a data line, measured in an 0.3 KHz–3.4 KHz range at intervals of 100 Hz, through the key board KB;

(2) To feed the parameters of equalization, for example delay equalization, the type of an equalizer, the normalized characteristics (for example 0.25-M-102) and other parameters required for the equalization through the key-board KB;

(3) To give a command for execution to a processing unit PU, for example, by depressing the "execute" button on KB, and then the PU calculates and memorizes the optimum setting value, permitting DU to provide a display, for example, a "ready" sign;

(4) When a switch in the section selecting circuit SSC is set to the low band equalization (LB), the display unit DU indicates the command whether or not to insert the low band equalization circuit (LB), by an "LB IN" or "LB OUT" sign. Then the switch LB in the setting unit SU is set according to said sign. Similarly, the high band equalization switch (HB) in the setting unit SU is set.

(5) To adjust the SU variable resistor SEC 1 - SEC 12 in accordance to the given indication for example, "SEC 1 coarse right", "SEC 1 fine right", "SEC 1 fine left" and "SEC 1 coarse left", which are given the display unit DU by setting the SSC selector switch to SEC 1; when the adjustment is made to within the range of the allowable error from the optimum setting, DU provides the display: "SEC 1 OK". The same steps are followed for setting SEC 2 through SEC 12. (6) To end the operation by coupling the setting unit SU to the circuit unit (CU) of the equalizer. For the above method, any algorithm for obtaining the setting value can be used. Generally, the most suitable algorithm is the so-called Zero Forcing (ZF), as is described in the following, because of the high efficiency in time. This algorithm is based upon the theory of minimizing the sum of the absolute values of the resultant equalization errors.

The sum of the absolute value of the errors given is by the following formula.

$$E = \sum_{i=1}^{l} ei = \sum_{i=1}^{l} | \sum_{k=j}^{n} f_{Ki} + gi - hi | \qquad (2)$$

where
E: Sum of the absolute values of equalization errors (Overall sum);
ei: Equalization error at a point frequency i (i: 1, 2, ... l) in a frequency band;
$f_{Ki}$: Characteristic value, at the points i in the K'th equalizing section (K: 1, 2, ... n), which is a function of $S(=j\omega)$ and $R_F$ mentioned in the formula (1) above;
gi: Desired characteristics at the point i;
hi: Measured characteristics at the point i.

The value of the optimum setting is obtainable by calculating the characteristic value according to the above formula. Furthermore, a DU "set" command or "end" sign is given by determining whether the present setting value is within the allowable error. Such calculation and determination are all performed in the PU program. (In the above example, i=32; K=14; gi=0).

As compared with the equalization method of the prior art, the above method has the following advantages:

(1) The time required for adjusting an equalizer is shortened since a single measurement of delay characteristics, for example, of those from the International Data Line, is sufficient;

(2) Equalization is of a relatively high precision;

(3) The equalization results can be reconstructed so that plurality of similar characteristics may be equalized;

(4) The operation is easy and does not require any skill;

(5) The system may easily be assembled by using devices generally available, and at a low cost;

(6) When the uniformity of electrical and mechanical interface is maintained, the present method is applicable for any other nature or type of equalization merely by changing the PU program.

Next, the second embodiment of the present invention will be described. While the first embodiment as described calculates the optimum setting value, the second embodiment determines whether an equalization error(ei) is allowed with respect to the normalized characteristics and indicates the result in a parallel and real time basis.

In the second embodiment, the maximum equalization capability of each equalization section and the equalization level defined by said capability are provided as well as the parameters defined in the first embodiment. The characteristics of l frequency points are calculated from the measured characteristics of m frequency points through proportional interpolation. However, that calculation is unnecessary when l is equal to m, but generally 2⊔n⊔m⊔l is satisfied. N=1 is a special case. The equalization error at the instant of adjustment, that is to say, the error of the characteristics of l frequency points from the desired characteristics is calculated and it is checked if said error is smaller than a normalized allowable characteristic. Said calculation is performed on a time division basis and rapidly enough to follow the change of the characteristics due to the manual adjustment. The result of the adjustment and the calculation is indicated for the next step of adjustment. When the characteristics of all the l frequency points are adjusted within the allowable error, the normalized characteristics (the allowable error) is decreased and the adjustment is repeated in view of the new set of normalized characteristics. Thus, the minimum equalization error is obtained, and the setting unit is connected to the circuit unit, then the equalizer is completely adjusted.

The equalizer simulator in the second method, similar to the one shown in FIG. 6, is additionally equipped with an equalizing level setting circuit LSC, which is capable of setting for maximum capacity, for example ± 25 percent, in the positive or negative direction of the equalizer. Therefore, in the second method, the equalizing error is expressed in the following relation:

$$ei = \sum_{K=1}^{n} f_{Ki} + gi - hi \pm L \qquad (3)$$

(where, L: Equalization level)

Figure 7:
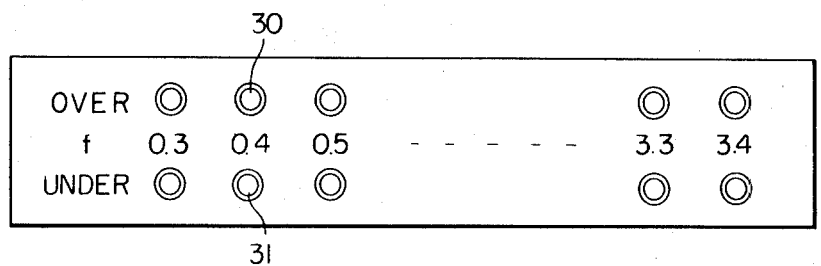
FIG. 7 is a schematic view of the arrangement of an example of a display unit according to the present invention.

The above equalization level is useful for finding out whether the level for all the equalizing sections should be modified when the SU adjustments fail to set the measured characteristics within the range of the normalized characteristics, whether the equalizer is sufficiently capable of equalizing the given measured characteristics, and is also useful as an auxiliary means for the "set" command to be given at the SU fine adjustment stage. DU in the second method, whose arrangement is shown in FIG. 7, is different from the one in the first method in FIG. 6. As shown in FIG. 7, the display unit DU, has l pairs of lamps 30, 31 (l=32 f=0.3 KHz through 3.4 KHz at intervals of 100 Hz) which are classified into two categories, "over" (the equalization error passing over the upper limit of the normalized characteristics) and "under" (the equalization error falling under the lower limit). The lamp indication is designed to match the direction of the SU setting adjustment. Accordingly, all the equalizing sections should be so adjusted that all the lamps are off.

The second method follows a procedure described below.

(1) To feed the measured delay characteristics from 0.3 KHz through 3.4 KHz at 100-Hz intervals as the input data through the key board KB:

(2) To feed the necessary parameters including the nature of equalization, for example delay equalization, the type of an equalizer, the normalized characteristics, for example 1.0-M-102, through the key board KB, permitting DU, to indicate, for example, a "ready" sign.

(3) To set the equalization level L= ±0;

(4) To give the processing unit PU a command for execution, for example, to depress the "execute" button of the key board, starting all the settings at all the "l" points;

(5) To set and adjust the switches of LB and HB and the variable resistors SEC 1 through SEC 12 in the setting unit SU so that all the lamps (30, 31) are off;

(6) To try a change of the equalization level when, with most of the lamps for either "over" or "under", being ON, equalization procedure is not possible, and to repeat the step, (5), (7) To feed narrower "normalized characteristics", for example, 0.5-M-102 or 0.25-M-102, through KB and to repeat the steps, (4), (8) To end the operation by coupling the setting unit SU to the circuit unit (CU) when the setting unit is so set and adjusted that the measured characteristics comes within the allowable range of the normalized characteristics.

In comparison with the first method, the second method shows much improvement in that the equalization error can be monitored and, the non-convergence state can be prevented and that the reason for such non-convergence can be found, and further that the second method can effect a highly flexible operation by equalizing only some of the selected bands or improving the equalization precision selectively in the middle bands.

There are a variety of applications of the above-described methods, such as for the construction of a dummy line characteristic, for training an operator in the equalization operation, and for the purpose of equalization simulation, when the desired characteristics are designated. Furthermore, FIG. 6 shows a method according to the present invention, that the combination of a circuit characteristic measuring instrument MI (for example M. 4942A produced by Hewlett-Packard) which is capable of being operated by remote control with a standard interface (IEEE standard interface for instance) is possible. A more simplified and speedier equalization is possible by such a combination.

From the foregoing it will now be apparent that a new and improved method for adjusting an equalizer has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A method for adjusting a band division type equalizer said equalizer comprising a circuit means including a plurality of equalizer sections and a setting means including a plurality of switches and a plurality of variable resistor means, each of said resistor means being connectable to one of said equalizer sections said method comprising:

(a) measuring the characteristics of a transmission line to be equalized with said setting means connected in said equalizer;

(b) disconnecting said setting means from said equalizer;

(c) calculating an adjustment value for each of said variable resistors of said setting means as a function of the measured equalization characteristic and a desired equalization characteristic;

(d) adjusting each of said variable resistors of said setting means in accordance with said adjustment value; and (e) reconnecting said setting means to said circuit means wherein said equalizer has the desired equalization characteristic.

2. A method for adjusting a band division type equalizer said equalizer comprising a circuit means including a plurality of equalizer sections and a setting means including a plurality of switches and a plurality of variable resistor means, each of said resistor means being connectable to one of said equalizer sections, said method comprising:

(a) measuring the characteristics of a transmission line to be equalized with said setting means connected in said equalizer;

(b) disconnecting said setting means from said equalizer;

(c) calculating the characteristics of each of said equalizer sections;

(d) calculating the difference between each of said calculated characteristics and a desired characteristic;

(e) adjusting each of said variable resistors of said setting means when the difference is greater than a predetermined value;

(f) repeating steps (d) and (e) until the difference is equal to or less than the predetermined value; and (g) reconnecting said setting means to said circuit means wherein said equalizer has the desired characteristic.

3. The method as set forth in claim 2 including energizing lights to indicate the calculated difference.

4. A band division type delay equalizer comprising:

(a) a circuit means including a plurality of equalizer sections each of said equalizer sections providing a delay characteristic to a portion of a signal on a transmission line wherein the characteristic of said delay equalizer is the sum of the delay characteristics of said equalizer sections; and (b) setting means connectable to and disconnectable from said circuit means said setting means including switch means and a plurality of variable resistors each of said variable resistors being connectable to one of said equalizer sections, wherein the resistance value of said variable resistors determines the delay characteristic of the corresponding equalizer section and the adjustment of said variable resistors thereby adjusts the delay characteristic of equalizer, said variable resistors being adjusted when disconnected from said corresponding equalizer section.

5. A band division type equalizer as set forth in claim 4 wherein each of said equalizer sections is a Moschytz type delay circuit, said Moschytz type delay circuit comprising a low-Q active filter.

6. A band division type equalizer as set forth in claim 5 wherein said Moschytz type delay circuit comprises:
   (a) an input terminal;
   (b) an operational amplifier
   (c) a passive RC network connected between said input terminal and an input to said operational amplifier;
   (d) resistance means connected between said input terminal and an input to said operational amplifier; and
   (e) feedback means connecting the output of said operational amplifier to said passive RC network.

* * * * *